(12) United States Patent
Li et al.

(10) Patent No.: US 11,783,080 B2
(45) Date of Patent: Oct. 10, 2023

(54) TAGGING OF USER BEHAVIOR DATA

(71) Applicant: Microsoft Technology Licensing, LLC, Redmond, WA (US)

(72) Inventors: Xin Li, Redmond, WA (US); Ang Lv, Redmond, WA (US); Chunyu Liu, Redmond, WA (US); Chunyu Li, Redmond, WA (US); Chao Wang, Beijing (CN); Eduardo D. Melo, Redmond, WA (US); Zhen Wang, Redmond, WA (US); Jiaojiao Li, Redmond, WA (US); Lve Chen, Redmond, WA (US); Lu Zhang, Redmond, WA (US); Peng Wang, Redmond, WA (US); Tong Wang, Redmond, WA (US); Xiaocheng Zhou, Redmond, WA (US); Yapu Jia, Redmond, WA (US); Ziqiang Liu, Redmond, WA (US); Yueyang Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 425 days.

(21) Appl. No.: 16/965,267

(22) PCT Filed: Jan. 25, 2019

(86) PCT No.: PCT/US2019/015048
§ 371 (c)(1),
(2) Date: Jul. 27, 2020

(87) PCT Pub. No.: WO2019/152262
PCT Pub. Date: Aug. 8, 2019

(65) Prior Publication Data
US 2021/0117569 A1 Apr. 22, 2021

(51) Int. Cl.
*G06F 9/44* (2018.01)
*G06F 21/62* (2013.01)
(Continued)

(52) U.S. Cl.
CPC ...... *G06F 21/6245* (2013.01); *G06F 11/3006* (2013.01); *G06F 11/3438* (2013.01); *G06F 11/3476* (2013.01)

(58) Field of Classification Search
None
See application file for complete search history.

(56) References Cited

U.S. PATENT DOCUMENTS 7,721,219 B2 * 5/2010 Harsh ............... G06F 8/38
715/239
9,576,147 B1 * 2/2017 McClintock ........ G06F 21/6245
(Continued)

FOREIGN PATENT DOCUMENTS

CN 103077356 A 5/2013
CN 103580919 A 2/2014
(Continued)

OTHER PUBLICATIONS

"File-system permissions", Retrieved from: https://en.wikipedia.org/w/index.php?title=File%ADsystem_permissions&oldid=814727114, Dec. 10, 2017, 7 Pages.
(Continued)

*Primary Examiner* — Qamrun Nahar
(74) *Attorney, Agent, or Firm* — Schwegman Lundberg & Woessner, P.A.

(57) ABSTRACT

The present disclosure provides a technical solution related to tagging user behavior data. The processing device and method may determine and tag user behavior data according to an application to which the user behavior data belong based on analysis on an inheritance relationship between
(Continued)

tasks associated with the user behavior data, so as to facilitate selectively deleting the user behavior data later.

19 Claims, 12 Drawing Sheets

(51) Int. Cl.
*G06F 11/30* (2006.01)
*G06F 11/34* (2006.01)

(56) References Cited

U.S. PATENT DOCUMENTS

| | | | |
|---|---|---|---|
| 10,354,184 B1* | 7/2019 | Vitaladevuni | G06Q 30/0253 |
| 2006/0224624 A1 | 10/2006 | Korn et al. | |
| 2014/0207824 A1* | 7/2014 | Brandwine | G06F 21/6209 |
| | | | 707/785 |
| 2015/0310195 A1 | 10/2015 | Bailor et al. | |
| 2020/0110901 A1* | 4/2020 | Barday | G06F 21/6245 |

FOREIGN PATENT DOCUMENTS

| | | |
|---|---|---|
| CN | 106650493 A | 5/2017 |
| CN | 107577706 A | 1/2018 |
| WO | 2015168203 A1 | 11/2015 |

OTHER PUBLICATIONS

"Office Action and Search Report Issued in European Patent Application No. 19704942.2", dated Jul. 6, 2022, 9 Pages.
"International Search Report and Written Opinion Issued in PCT Application No. PCT/US19/015048", dated Apr. 8, 2019, 11 Pages.
"Office Action and Search Report Issued in Chinese Patent Application No. 201810107080.9", dated Oct. 10, 2022, 12 Pages.
"Office Action Issued in Chinese Patent Application No. 201810107080.9", dated Mar. 28, 2023, 5 Pages.
"Office Action Issued in Chinese Patent Application No. 201810107080.9", dated May 24, 2023, 5 Pages.
"Notice of Allowance Issued in Chinese Patent Application No. 201810107080.9", dated Jul. 26, 2023, 4 Pages.

* cited by examiner

| 201 | 202 | 203 | 204 | 205 | 206 |
|---|---|---|---|---|---|
| asd@aaa.com | 20180101 | Today's weather | www.weather.com/page1 | 124.202.202.222 | $GPRMC,204700,A,3403.868,N,11709.432,W,001.9,336.9,17069 8,013.6,E*6E |

TAGGING OF USER BEHAVIOR DATA

CROSS-REFERENCE TO RELATED APPLICATION

This application is a U.S. National Stage Filing under 35 U.S.C. 371 of International Patent Application Serial No. PCT/CN2019/015048, filed Jan. 25, 2019, and published as WO 2019/152262 A1 on Aug. 8, 2019, which claims priority to Chinese Application No. 201810107080.9, filed Feb. 2, 2018; which applications and publication are incorporated herein by reference in their entirety.

BACKGROUND

With the development of artificial intelligence technology, intelligent robots are widely used in all kinds of operating systems, providing users with all kinds of auxiliary operations, and being able to communicate with users on some level. The communication with the intelligent robots has also become an important channel for users to acquire various knowledge and information. Therefore, it is required that the intelligent robots may acquire knowledge better and provide users with knowledge as needed more accurately and comprehensively.

BRIEF SUMMARY

The embodiments of the present disclosure are provided to give a brief introduction to some concepts, which would be further explained in the following description. This Summary is not intended to identify essential technical features or important features of the subject as claimed nor to limit the scope of the subject as claimed.

The embodiments of the present disclosure may provide a technical solution on the tagging of user behavior data, which may determine and tag user behavior data according to an application to which the user behavior data belongs by performing analyzing on an inheritance relationship between tasks associated with the user behavior data, so as to facilitate subsequent operation of deleting the user behavior data selectively.

The above description is merely a brief introduction of the technical solutions of the present disclosure, so that the technical means of the present disclosure may be clearly understood, and implemented according to the description of the specification, and the above and other technical objects, features and advantages of the present disclosure may be more obvious based on the embodiments of the present disclosure as follows.

BRIEF DESCRIPTION OF THE DRAWINGS

FIG. 2 is an exemplary block diagram of a structure of user behavior data according to an embodiment of the invention;

DETAILED DESCRIPTION

Figure 1:
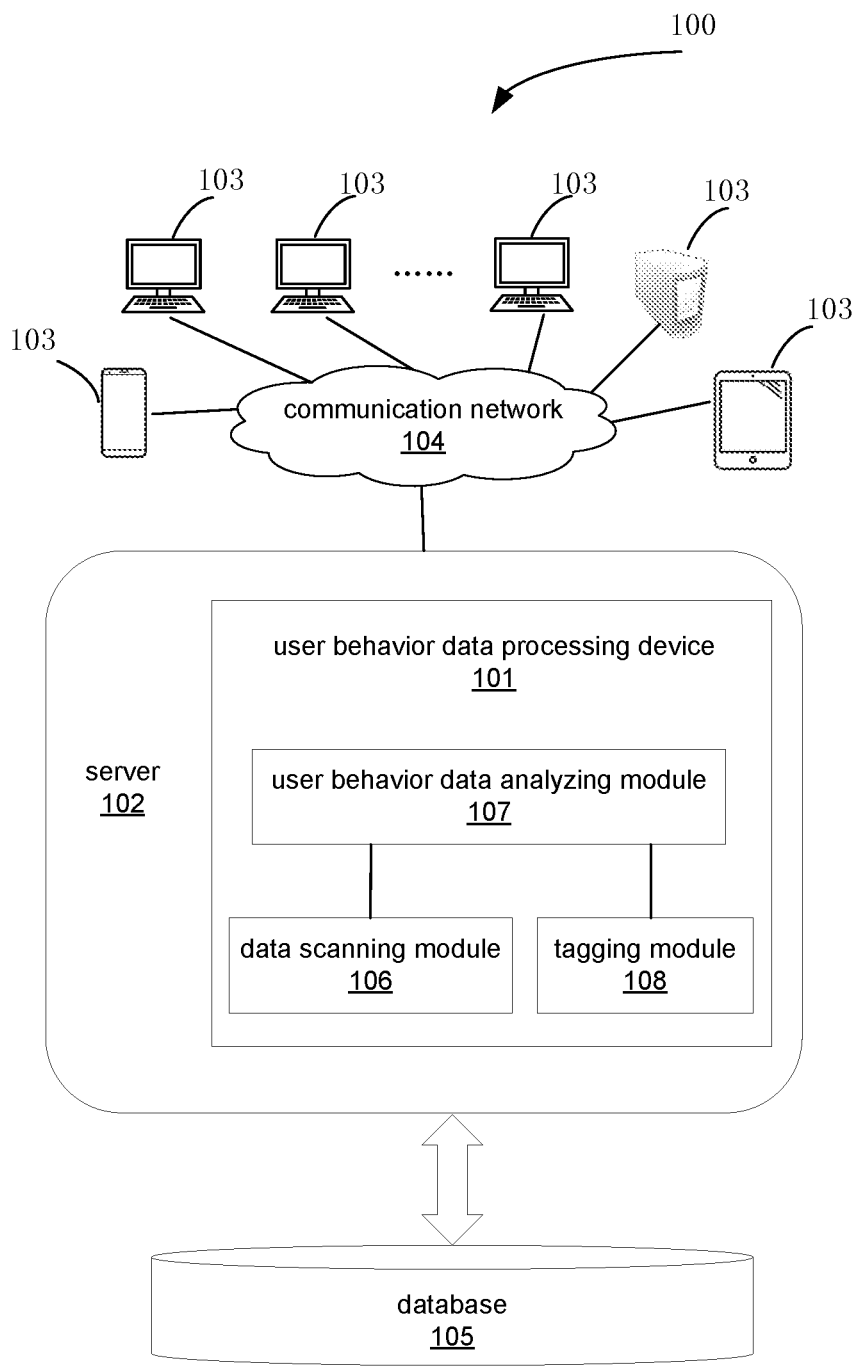
FIG. 1 is an exemplary block diagram showing a processing device for the user behavior data according to an embodiment of the present disclosure.

In the following, description will be given in detail on the exemplary embodiments of the present disclosure, in connection with the accompanying drawing. Although drawings show the exemplary embodiments of the present disclosure, it should be appreciated that the present disclosure may be implemented in various ways without being limited by the embodiments set forth herein. On the contrary, these embodiments are provided for thorough understanding of the present disclosure, and completely conveying the scope of the present disclosure to the skills in the art.

The following description sets forth various examples along with specific details to provide a thorough understanding of claimed subject matter. It will be understood by those skilled in the art, however, the claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The term "technique", as cited herein, for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

With the development of computer technology, users rely on computers more and more, and use a variety of applications (APPs) every day no matter in daily life or in office work. In order to better serve users, the applications may further record users' using behaviors, thereby generating user's using behavior data. Such user's using behavior data belongs to user's privacy. Furthermore, with the development of the big data analyzing technique and the computer technology, such as artificial intelligence, users' using habits and user's characteristics may be obtained more deeply by performing analysis on users' using behavior data, and user's behavior may be further predicted on some level.

Using of the user behavior data is a mixed blessing. On one hand, such using may facilitate users' using on applications more, and bring more intelligence to users' life and work. For example, more suitable commodities may be recommended to the users or provide a variety of recommendations to the user, based on analysis on the user behavior data. On the other hand, more user's privacy may be exposed due to the using of the user behavior data, and even the users' using behaviors may be interfered by applications conversely. For example, advertisements and the like may be pushed to users based on user using behavior data.

Considering the above situations, it is reasonable to let users determine whether or not their user behavior data should be further used. When a user would like to protect his/her own privacy, the user would like to delete his/her own user behavior data completely. In practical application, such needs of users are often not so simple. In many cases, users may only want to completely delete user behavior data recorded by one application or some applications, and would like to retain user behavior data recorded by another application or some other applications. For example, users would not like their user behavior data about shopping to be further used, and therefore would like their user behavior data generated in using of shopping applications to be deleted. For example, an input method application may record users' using behaviors when the users are using the input method, and provide suggestions on inputted words according to the users' using habits. Such using of the user behavior data may be very valuable to many users and thus they would like to retain such user behavior data.

Considering the above requirements, an embodiment of the invention proposes a processing method and device for user behavior data, which may enable a user to selectively completely delete the user behavior data when the user would like to delete the user behavior data.

In the embodiments of the invention, the application refers to an application program provided to users to be used by the users, i.e., an application program that may be used by users and may record user's behaviors. These applications may be application programs provided by an operating system to implement a function, for example, an input method application, a browser application, a calendar application, etc. provided by an operating system, and may also be application programs developed by a third party other than the operating system and run on the operating system, for example, a shopping application, a game application, a music playing application, etc. The sources generating user behavior data may be the applications used by users.

The generated user behavior data may be used by such applications to provide users with better services. For example, an input method application records users' inputting habits, and then generates suggestions on input in subsequent inputting process. As another example, a shopping application stores records of browsing and purchasing of a user, and presents commodities that are likely to be needed by the user on the home page of the shopping application based on analysis on the records of browsing and purchasing.

User behavior data may be further used by services other than the above applications. To better distinguish description, non-user oriented applications may be referred as services. For example, a browsing record or searching record in using a browser application by a user may be used by a service pushing advertisements to push advertisements to the user in using the browser. It should be noted that, user behavior data recorded by an application are provided to be used by a service other than the application, and such using should be a using complying with legal norms and should be allowed by users (for example, prompting the users by messages or signing a using agreement associated with the user behavior data with the users, etc.). In addition, an example of using user behavior data is provided to illustrate various possibilities of implementation in the technical aspect, and does not refer to an actual processing method of a specific company or individual. Moreover, the embodiments of the invention may focus on tagging and deleting with respect to user behavior data, rather than acquiring and using with respect to user behavior data.

No matter being used by an application itself, or being used by a service other than the application, originally recorded user behavior data (referred as origin user behavior data) are likely to be copied or deformed to generate derived user behavior data (referred as derived user behavior data). The executive subject for generating or using user behavior data is a task. The task cited herein may be generated based on an application or service, a specific running unit running the application or the provided functions, and may be regarded as a subroutine, a routine, a thread, or the like.

In the art, there is no unified standard of the mechanism for recording user behavior data, and derived user behavior data may be generated due to the using of a task of an application or service. New derived user behavior data may be generated with the derived user behavior data as the task is used.

The recording format or storage mode and storage location of the above origin user behavior data and derived user behavior data may be greatly different with respect to different applications or tasks. When it is required to delete user behavior data of an application, it may be very difficult to pick out all user behavior data belonging to the application. Therefore, it is also very difficult to completely delete all user behavior data belonging to the application.

In the embodiments of the invention, all user behavior data are identified by way of data scanning. Such data scanning may be done by determining whether or not a piece of data is user behavior data by recognizing user identification information.

Then, an application to which the user behavior data belongs is determined. The belonging relationship cited herein refers to an application which is a source generating the user behavior data, and in the case that the user behavior data is derived user behavior data, it is expected to determine which application is the application generating the origin user behavior data corresponding to the derived user behavior data.

No matter the origin user behavior data or the derived user behavior data will be used by various tasks or be generated by these tasks. In view of the above, the user behavior data may have a direct correlation relationship with specific tasks, and these tasks may be found based on the correlation relationship between the user behavior data and tasks. These tasks may be created by various applications or services or operating systems. However, the applications or services or operating systems creating these tasks may not always be the sources generating the origin user behavior data.

Considering this circumstance, an inheritance relationship between these tasks may be reanalyzed to find a source application capable of generating the origin user behavior data by tracing back the inheritance relationship, thereby determining the application to which the user behavior data belongs.

Upon determining the application to which the user behavior data belongs, the user behavior data may be tagged, so as to better recognize the applications to which the user behavior data belongs in subsequent processing on the user behavior data, and selectively delete the user behavior data. When a user would like to delete user behavior data of an application, the user may completely delete all user behavior data belonging to the application based on preset tags without interfering with user behavior data generated by other applications.

Detailed description would be made on processing on user behavior data below.

FIG. 1 is an exemplary block diagram 100 showing a processing device for the user behavior data according to an embodiment of the present disclosure. The user behavior data processing device 101 in FIG. 1 may implemented as or provided in a small portable (or mobile) electronic device, such as cell phone, personal digital assistant (PDA), personal media player device, wireless network player device, personal headset device, IoT (internet of things) intelligent device, dedicate device or combined device containing any of functions described above. The user behavior data processing device 101 may be also implemented or provided in a personal computer including configurations of laptop computer and non-laptop computer. Furthermore, the user behavior data processing device 101 may be further implemented as a server on internet or provided in a server on internet. Such server may be implemented in one or more computer systems (distributed server), or implemented as a server based on cloud technology or provided in a server based on cloud technology, which may be connected with a user terminal via a communication network to provide users with searching service of knowledge based on cloud.

As an example, a user behavior data processing device 101 shown in FIG. 1 is provided in a server 102, and various applications may be run in a user terminal 103. The user terminal 103 may be in communication connection with the server 102 via a communication network 104. The communication network 104 may be a wide area network, a local area network, or a combination thereof. The communication network 104 may be implemented in the form of a wired network or a wireless network (wireless local area network (WLAN) or mobile communication network).

Some or all of background programs of the applications may run based on the server 102. The server 102 may be a cloud server, and these applications may run based on a virtual machine in the cloud server. When an application is running, the application records users' using behaviors, generates user behavior data, and stores the user behavior data in a database 105. The user behavior data may be stored in a hard disk or internal storage of the server 102, or be stored in the user terminal 103. The user behavior data may be acquired from the user terminal 103 when being needed by the server 102. Furthermore, an application may run locally in the user terminal 103, records user behavior data, and uploads the user behavior data to the server 102 via a communication network. When the server 102 is a server based on cloud architecture, background programs of an application mainly run on cloud. The server 102 may directly generate user behavior data, and record the user behavior data in the server 102 or the database 105. In this example, description is made with user behavior data stored in the database 105 as an example.

A user behavior data processing device 101 includes a data scanning module 106, a user behavior data analyzing module 107 and a tagging module 108.

The data scanning module 106 may be configured to scan data to recognize user behavior data. The data cited herein may be data in a specific form, such as data stored in the form of a data table. More particularly, each row in the data table is used as a piece of data. Each piece of data has a plurality of items, and whether or not the piece of data is user behavior data may be determined by recognizing the content of each item. A typical feature of user behavior data is containing user identification information. If the piece of data contains user identification information, the piece of data may be determined as user behavior data.

User identification information generally has a certain format, such as a mailbox name and a cell phone number, or may be attached with some identifications. For example, a form of "USERID+username" may be used. Furthermore, user behavior data recorded by an application may have some formats. For example, in a case of user behavior data, generally user identification information may be recorded in the first item of each piece of data. According to such formats or rules, the data belonging to user behavior data may be recognized, and analyzing on the user behavior data may be further performed.

As shown in FIG. 2, which is an exemplary structural block diagram 200 of user behavior data according to an embodiment of the invention, a piece of users' using data based on a search engine of a browser is shown.

User behavior data in the illustrative block diagram 200 may include the following fields: a data item 201 of a user ID, a data item 202 of date information, a data item 203 of user searching content, a data item 204 of page information of the page clicked by a user based on the searching result, a data item 205 of the user's IP address, and a data item 206 of the user's GPS information.

The data scanning module 106 does not know about the meaning of each data fragment in the process of data scanning, but may determine whether or not a piece of data is user behavior data through analysis based on some basic characteristics of user behavior data described above. It may be seen from the example in the figure that the data item 201 is a mailbox address, and is in the first field of the piece of data. This data may be determined as the user behavior data based on the general characteristics of user behavior data.

The data scanning module 106 may scan data in a data stream, upon the server 102 receives the data stream, so as to recognize the user behavior data, and may further scan and recognize stored data. For example, data may be read from the database 105, and the operation of scanning and recognizing may be performed. In embodiments, the data scanning module 106 may scan data in a specified time period, for example, scan data of a day before at fixed time every day, so as to start the user behavior data tagging.

The user behavior data analyzing module 107 may be configured to determine an application to which the user behavior data belongs based on an inheritance relationship between a plurality of tasks associated with the user behavior data.

The correlation relationship between tasks and user behavior data as cited herein mainly includes: a task records users' using behaviors to generate origin user behavior data, a task uses the user behavior data, and a task generates derived user behavior data due to using on the user behavior data, etc. With analysis on the correlation relationships, an inheritance relationship between various tasks may be obtained, so as to trace back to a source application generating the origin user behavior data, i.e., determine an application to which a source task in the inheritance relationship of a plurality of tasks associated with the user behavior data belongs as the application to which the user behavior data belongs.

In practical application, it may be not required to determine the application to which the user behavior data belongs only when the task generating the origin user behavior data is tracked back to. The using of the user behavior data generally refers to using by the application generating the origin user behavior data, or using by other services or operating systems, and the attribute of each task may be recognized forward from the end of the inheritance relationship. If a task is recognized as being created by an application, the application may be determined as the application to which the user behavior data belongs.

In addition, the user behavior data analyzing module 107 may recognize user behavior data of a specified application. In this case, the user behavior data analyzing module 107 may preset a list of specified applications. When performing analyzing on a task, the application to which the user behavior data belongs may be determined only when the analysis shows that the application to which the task belongs arises in the list of specified applications.

More particularly, the operating system may generally record the using of the data by the tasks in a system log. Therefore, the user behavior data analyzing module 107 may analyze a using record of the using of the user behavior data by the tasks and/or a generating record of the generating of the user behavior data by the tasks stored in the system log to determine the inheritance relationship between the tasks. The information on the application or service or operating system to which the tasks belong may be obtained from the system log or the attribute information of the tasks.

Figure 3:
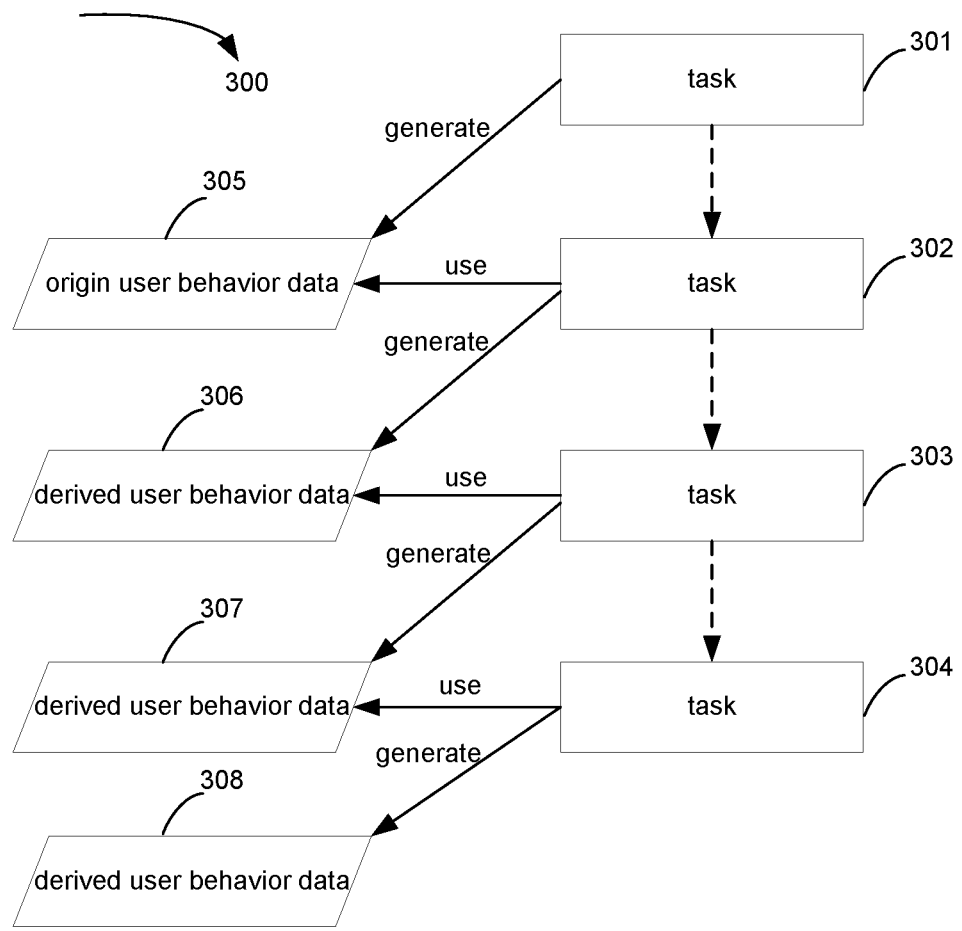
FIG. 3 is a schematic structural diagram of correlation relationship between user behavior data and tasks according to an embodiment of the invention.

As shown in FIG. 3, which is a schematic structural diagram 300 of correlation relationship between user behavior data and tasks according to an embodiment of the invention, there may be two relationships between tasks and user behavior data. One relationship is that tasks generate user behavior data, and the generating relationship may generate origin user behavior data, and may also generate derived user behavior data. The other is that tasks use user behavior data, the process of which generally may trigger the processing of generating derived user behavior data. As shown in FIG. 3, a task 301 is a user oriented application, which generates origin user behavior data 305, and then a task 302 uses the origin user behavior data 305 to generate derived user behavior data 306, and then a task 303 uses the derived user behavior data 306 to generate derived user behavior data 307, after which the derived user behavior data 307 is used by a task 304 to generate derived user behavior data 308. In this way, a chain of correlation relationship between tasks and user behavior data may be generated. The chain formed by the tasks is an inheritance relationship (represented by an arrow in dash lines in the figure). In terms of using on the user behavior data, the task 304 uses the derived user behavior data generated by the task 303, and there is the inheritance relationship between the task 304 and the task 303. When determining an application to which the user behavior data belongs, if the application to which the user behavior data belongs cannot be determined by the task 304, the application to which the task 303 belongs may be checked, and if the application to which the user behavior data belongs cannot be determined, tracing back may be performed till the task 301. If a task during the tracing back can recognize the application to which the user behavior data belongs, the tracking back may be terminated.

For example, a searching task created by a search engine application records users' searching behaviors, and generates the user behavior data as shown in FIG. 2 in the process of searching. The user behavior data generated at this time may be origin user behavior data. Hereafter, the user behavior data is used by an advertising service to push advertisements to users based on users' searching behaviors. In the process of using, the advertising service copies the origin user behavior data, and generates user behavior data in a form complying with the requirements by the advertising service. The user behavior data is derived user behavior data. Hereafter, the derived user behavior data generated by the advertising service is used by a data statistics service of a data analysis platform for performing statistics on advertising pushing information so as to generate new derived user behavior data. Analysis on the derived user behavior data generated by the data statistics service shows that the task generating the derived user behavior data belongs to the data statistics service of the data analysis platform, which is not an application capable of generating the origin user behavior data. Therefore, the search engine application may be found by further tracing back.

The tagging module 108 may be configured to tag the user behavior data based on the application to which the user behavior data belongs. Based on the application to which the user behavior data belongs determined by the user behavior data analyzing module 107, the user's using behavior data may be distinguishingly tagged based on the application to which the user using behavior data belongs, so as to prepare for subsequent processing. The specific tagging method may directly add application identification information to the user behavior data, or add application identification information to data indexes, or generate a new index with respect to the user behavior data so as to add application identification information to the new index. The tagged user behavior data or index may be rewritten in the database 105 to replace the original data, and the original data in the database 105 may be amended directly.

According to an embodiment of the invention, the using on the tagged user behavior data is not limited to a deleting operation on the user behavior data, and may be subsequent sorting or informational statistics on the user behavior data, etc.

Figure 4:
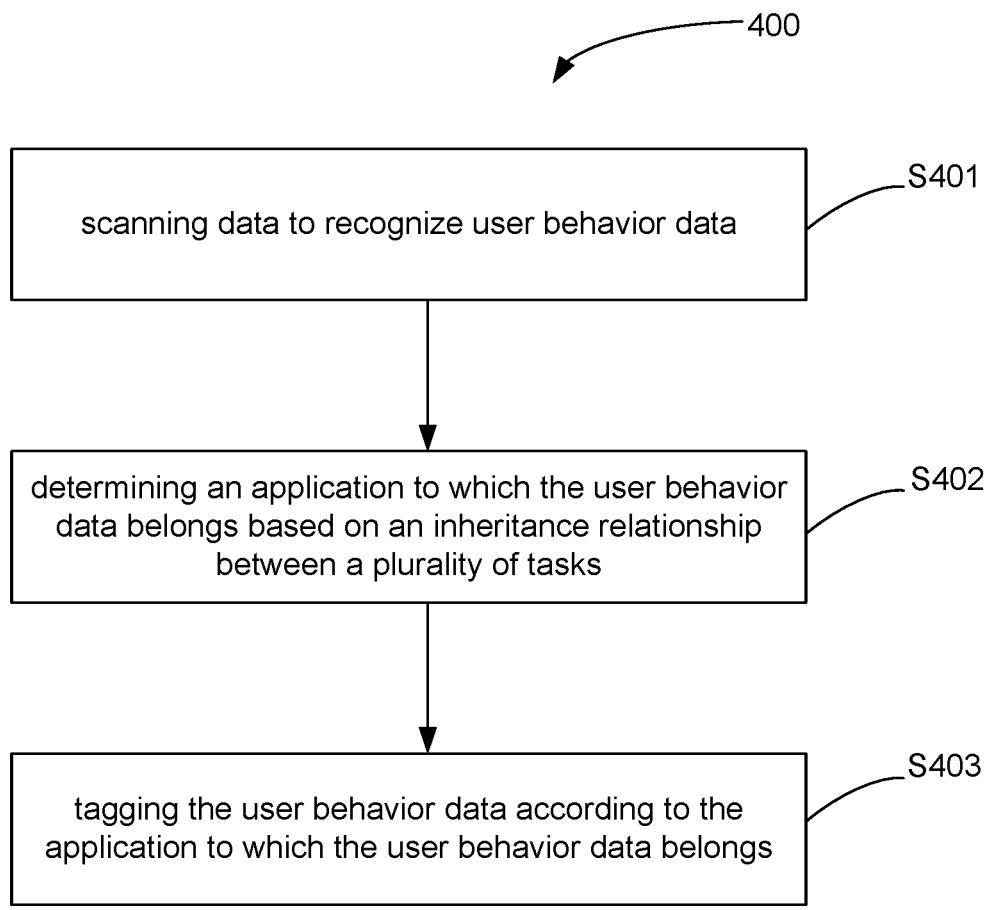
FIG. 4 is a schematic flowchart showing a processing method for user behavior data according to an embodiment of the invention.

The processing on the user behavior data performed by the user behavior data processing device 101 in the FIG. 1 may be, e.g., as shown in FIG. 4, which is a schematic flowchart 400 showing a processing method for user behavior data according to an embodiment of the invention. The processing method may include the following steps.

S401: scanning data to recognize user behavior data. The processing in the step may be performed by the data scanning module 106.

S402: determining an application to which the user behavior data belongs based on an inheritance relationship between a plurality of tasks associated with the user behavior data. The processing in the step may be performed by the user behavior data analyzing module 107. The inheritance relationship between the tasks may be determined based on a using record of the using on the user behavior data by the tasks and/or a generating record of the generating on the user behavior data by the tasks recorded in a system log.

The determining an application to which the user behavior data belongs based on an inheritance relationship may include: performing recognizing on applications to which the plurality of tasks with the inheritance relationship belong, and determining an application having a function of recording user behavior data as the application to which the user behavior data belongs, if the application has been recognized. In this way, the recognizing on the tasks may be performed along the chain of the inheritance relationship, and may be terminated when a task meeting the requirements is recognized.

The determining an application to which the user behavior data belongs based on an inheritance relationship may further include: determining an application to which a task as a source in the inheritance relationship belongs as the application to which the user behavior data belongs. In this way, it may be more accurate to find a source task of the inheritance relationship chain and directly use an application to which the source task belongs as the application to which the user behavior data belongs.

S403: tagging the user behavior data according to the application to which the user behavior data belongs. The processing in the step may be performed by the tagging module 108.

The process of tagging the user behavior data is illustrated above, and then the mechanism of deleting after the processing of tagging is described below.

Figure 5:
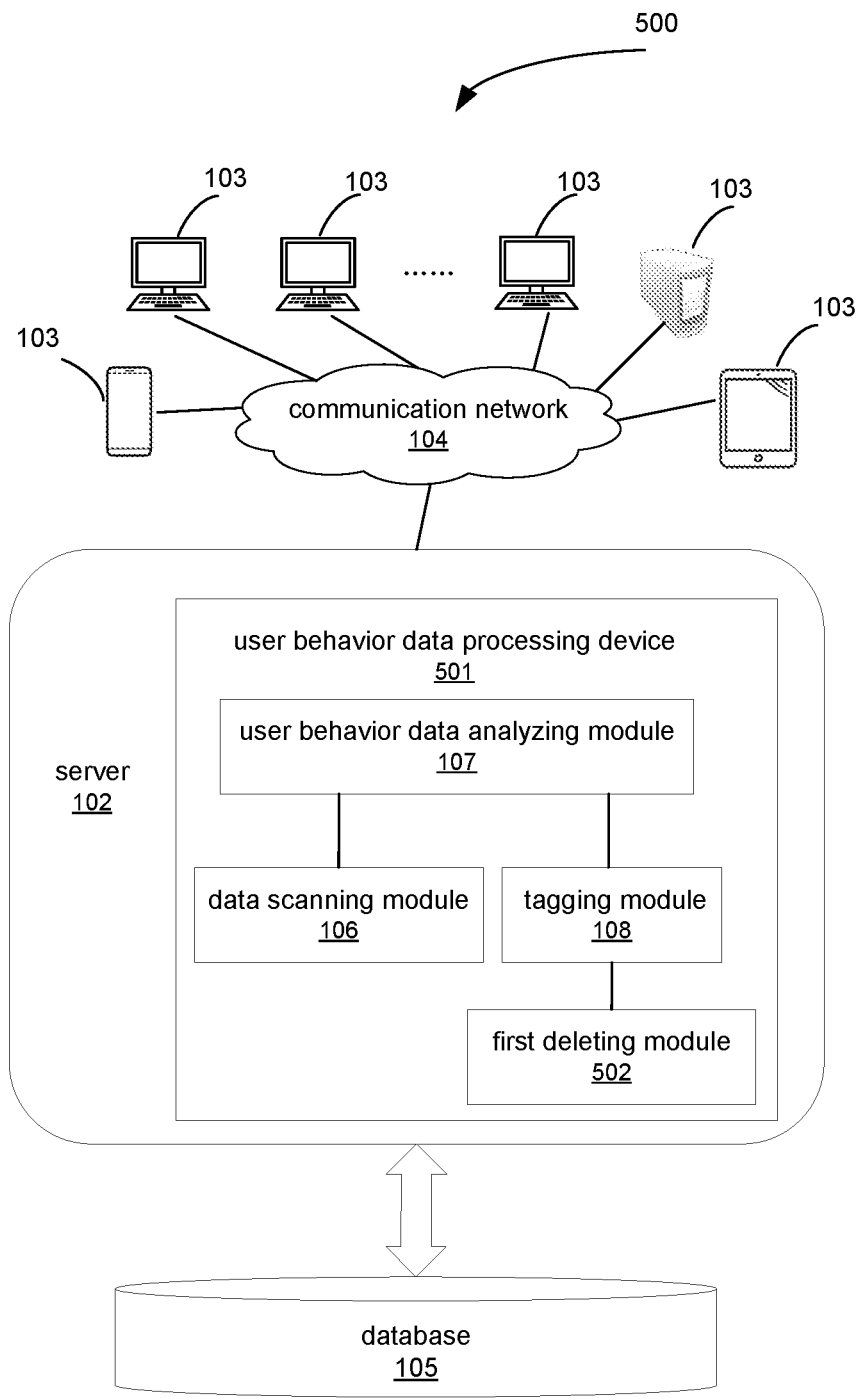
FIG. 5 is another exemplary block diagram showing a processing device for the user behavior data according to an embodiment of the present disclosure.

As shown in FIG. 5, which is another exemplary block diagram 500 showing a processing device for the user behavior data according to an embodiment of the present disclosure, the user behavior data processing device 501 as shown in FIG. 4 is same as the data processing device 101 as shown in FIG. 1, except that the user behavior data processing device 501 further includes a first deleting module 502.

The first deleting module 502 may be configured to acquire user's using behavior data of an application tagged as the specified application, and performing the processing of deleting user's using behavior data of the specified application, in response to an instruction for deleting user's using behavior data of a specified application.

After completing the tagging on the user behavior data, the tagging module 108 may receive a user's instruction, and delete user behavior data of the specified application. The processing of deleting user behavior data may include performing searching on data in the database 105, so as to find user behavior data of the tagged specified application, and then performing massive searching.

It should be noted that the first deleting module 502 may be a module independent from the tagging module 108. As stated in the foregoing description, the data scanning module 106, the user behavior data analyzing module 107 and the tagging module 108 may periodically perform the processing of tagging the user behavior data, while the first deleting module 502 may receive users' instructions at any time, and perform the processing of deleting the tagged user behavior data.

Figure 6:
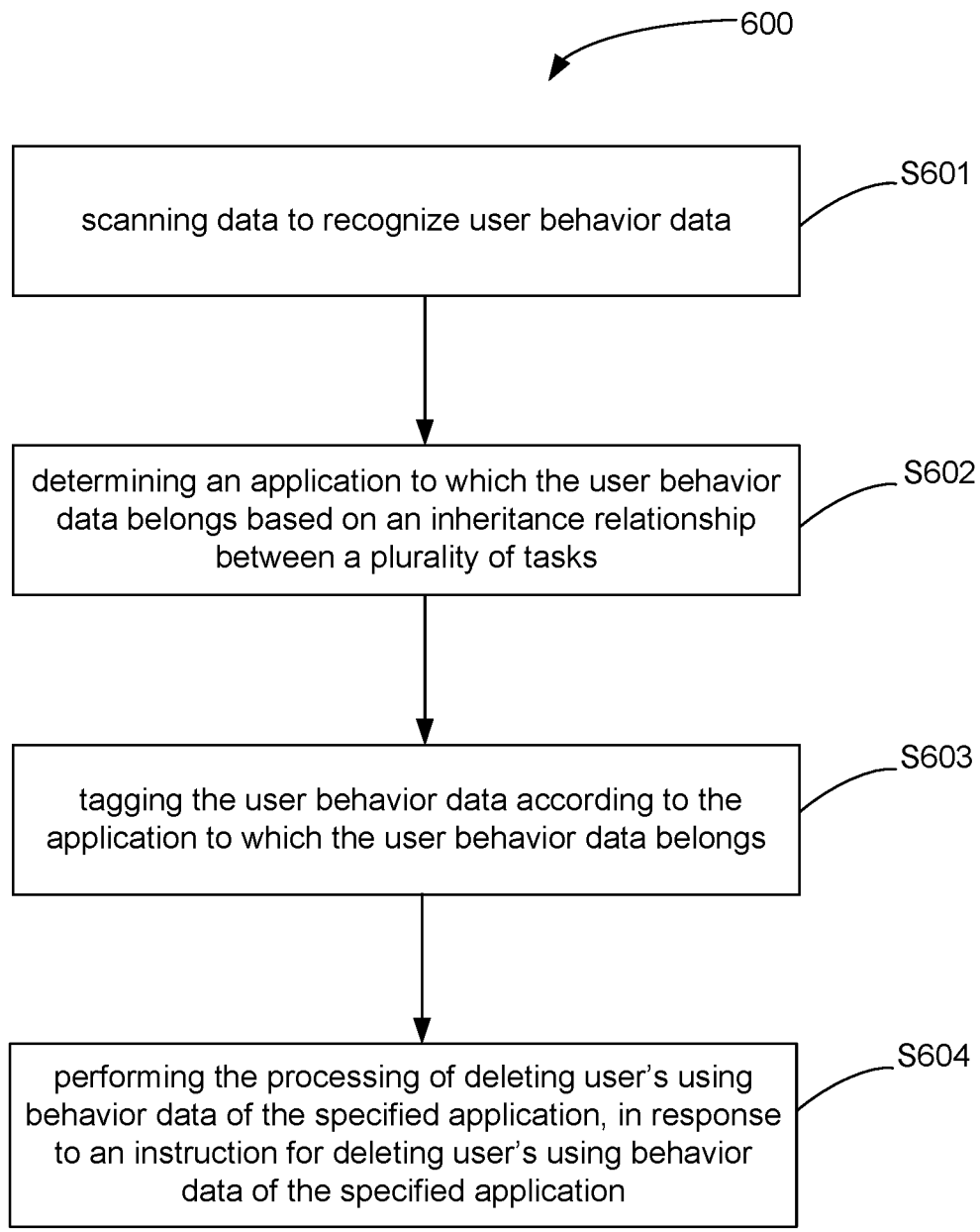
FIG. 6 is another schematic flowchart showing a processing method for user behavior data according to an embodiment of the invention.

The processing on the user behavior data performed by the user behavior data processing device 101 as shown in the FIG. 5 may be, e.g., shown in FIG. 6, which is another schematic flowchart 600 showing a processing method for user behavior data according to an embodiment of the invention. The processing method may include the following steps.

S601: scanning data to recognize user behavior data. The processing in the step may be performed by the data scanning module 106 described above.

S602: determining an application to which the user behavior data belongs based on an inheritance relationship between a plurality of tasks associated with the user behavior data. The processing in the step may be performed by the user behavior data analyzing module 107.

S603: tagging the user behavior data according to the application to which the user behavior data belongs. The processing in the step may be performed by the tagging module 108.

S604: acquiring user's using behavior data of an application tagged as a specified application, and performing the processing of deleting user's using behavior data of the specified application, in response to an instruction for deleting user's using behavior data of the specified application. The processing in the step may be performed by the first deleting module 502.

The specific processing in the steps has been illustrated in detail above, and repeated description would be omitted to avoid redundancy.

The processing of tagging the user behavior data has been described above. In practical application, the purpose for using the user behavior data may be different, but there may be differences in influences on user experience and subsequent users' using behaviors by retaining or deleting the user behavior data due to different purposes for using the user behavior data. Therefore, different deleting policies may be selectively performed based on the different purposes of using.

In an embodiment of the invention, the user behavior data may be divided into two major categories based on the influence on subsequent users' using and user experience, and different deleting strategies may be performed based on different following categories.

1) User Behavior Data Affecting Subsequent Users' Using or User Experience the operation of deleting such user behavior data may be immediately performed when receiving a user's instruction for deleting such user behavior data.

For example, if some user behavior data is used to be provided to advertisers for pushing advertisements, the user behavior data have a great influence on users' using behaviors or user experience. If the user behavior data is retained, users will receive advertisements pushed based on user behavior data during using an operating system or an application. If the user behavior data is deleted, then the corresponding pushed advertisements may disappear. Some users may greatly dislike such pushing of advertisements. If all user behavior data of a specified application cannot be promptly deleted when a user would like to delete the user behavior data, the user may still receive pushed advertisements, which will affect the user's using and user experience. As another example, some user behavior data is to predict possible users' using habits, so as to assist users' using on a system or an application. The deleting status of user behavior data may have a significant influence on subsequent users' using or experience. Some users may like suggestions by input methods, while some users do not like such suggestions, nor expect that their own inputting habits are recorded.

2) User Behavior Data without Affecting Subsequent Users' Using or User Experience It may be unnecessary for such user behavior data to be deleted immediately, and may be deleted after completing a purpose of using the user behavior data in a certain time period.

In general, there are two using purposes for using such user behavior data:

1. An operating system or some applications or services use such user behavior data for data statistics. For example, a using purpose may be to count how many users use a search engine to retrieve technical documents during the last one month, how many users use a search engine during the last one week, or the like. It would be acceptable for a user to have such user behavior data be deleted within a preset time range. Such user behavior data may be used relatively infrequently, and therefore may have a little influence on user's privacy.

2. An engineer uses the user behavior data for debugging an application or a service or an operating system. Such user behavior data are used more infrequently, and thus have rare influence on user's privacy. Therefore, such user behavior data may be deleted after being retained for a long time period, or be deleted after all debugging operations are completed.

Figure 7:
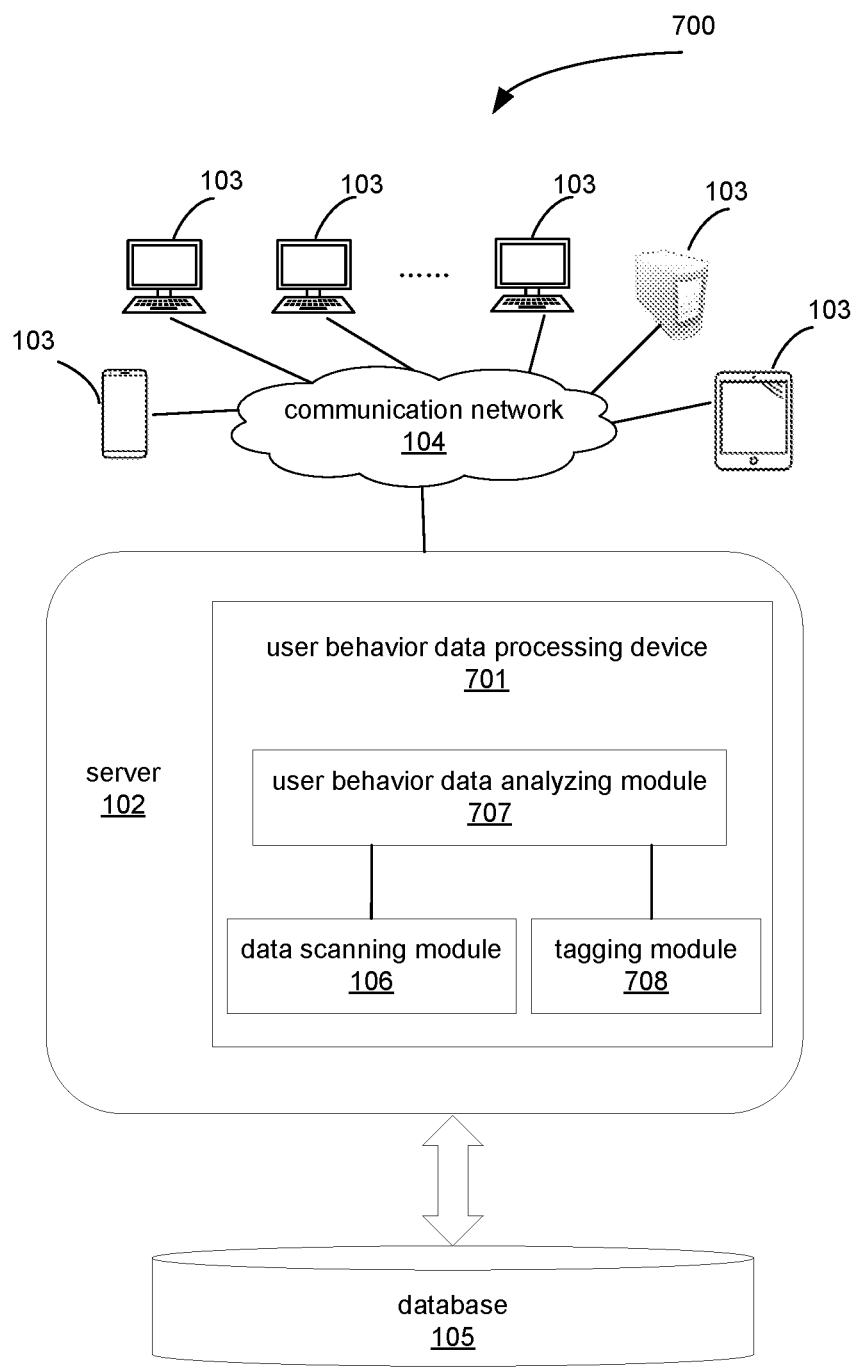
FIG. 7 is another exemplary block diagram showing a processing device for the user behavior data according to an embodiment of the present disclosure.

Based on the above analysis on the technical mechanism, an embodiment of the invention proposes the following user behavior data processing device, as shown in FIG. 7, which is another exemplary block diagram 700 showing a processing device for the user behavior data according to an embodiment of the present disclosure. A user behavior data processing device 701 as shown in FIG. 7 includes a data scanning module 106, a user behavior data analyzing module 707 and a tagging module 708.

More particularly, the functions performed by the user behavior data analyzing module 707 and the tagging module 708 are functions expanded based on the functions performed by the data analyzing module 107 and the tagging module 108 shown in FIG. 1 and FIG. 5.

More particularly, the functions performed by the data analyzing module 707 may be same as the functions performed by the data analysis module 107, except that the functions performed by the data analyzing module 707 may further include acquiring a log of using the user behavior data, and determining a using purpose for using the user behavior data based on the log of using the user behavior data. As described above, the operating system may record the using behaviors of the data in the system log, while the data analyzing module 707 may extract the log of using the user behavior data from the system log, so as to acquire information related to the service or application using the log from the log, and further obtain information related to the number of times and/or frequency of using the user behavior data from the log by analyzing the log. The using purpose for using the user behavior data may be determined based on such information.

The using purpose for using the user behavior data may be determined as a using purpose affecting users' using, if the number of times and/or frequency of the using on the user behavior data is more than a preset first threshold (the threshold may be determined depending on the practical situation) and/or the using on the user behavior data affects subsequent users' using behaviors. For example, if the service using the use behavior data is determined as a service of an advertising provider, it may be determined that the using purpose may have an influence on subsequent users' using. In addition, if some user behavior data are found to be used frequently, then no matter whether or not the user behavior data has a direct influence on subsequent users' using behaviors, the user behavior data at least has serious risks of revealing user's privacy, and therefore should be determined as the user behavior data affecting users' using.

The using purpose for using the user behavior data may be determined as a using purpose unassociated with users' using, if the user behavior data is unassociated with subsequent users' using behaviors. Such user behavior data may be characterized in that the number of times of being used and/or frequency of being used is low, and/or the services using the user behavior data are all non-user oriented, and may be safe in protecting user's privacy. The factors, such as whether or not the services using the user behavior data are safe or have an influence on users' using, may be processed in combination with a way of black and white list.

The functions performed by the tagging module 708 may be same as the functions performed by the tagging module 108, except that the functions performed by the tagging module 708 may further include performing a using purpose tagging on the user behavior data based on the using purpose determined by the data analyzing module 707. After being subjected to the processing by the tagging module 708, the user's using behavior data is tagged with not only the application to which the user's using behavior data belongs, but also a label identifying whether or not the using purpose affects users' using.

It should be noted that the user behavior data processing device 701 according to an embodiment of the invention may be independently from the user behavior data processing device shown in the FIG. 1 and FIG. 5. That is to say, the user behavior data processing device 701 mainly performs distinguished tagging on the using purpose for using the user behavior data. The data analyzing module 707 and the tagging module 708 in the user behavior data processing device 701 are no longer used as the data analyzing module 107 and the tagging module 108, but have expanded functions. The data analyzing module 707 may be configured to acquire a log of using the user behavior data, and determine a using purpose for using the user behavior data based on the log of using the user behavior data. The tagging module 708 may be configured to use purpose tagging on the user behavior data based on the using purpose determined by the data analyzing module 707.

Figure 8:
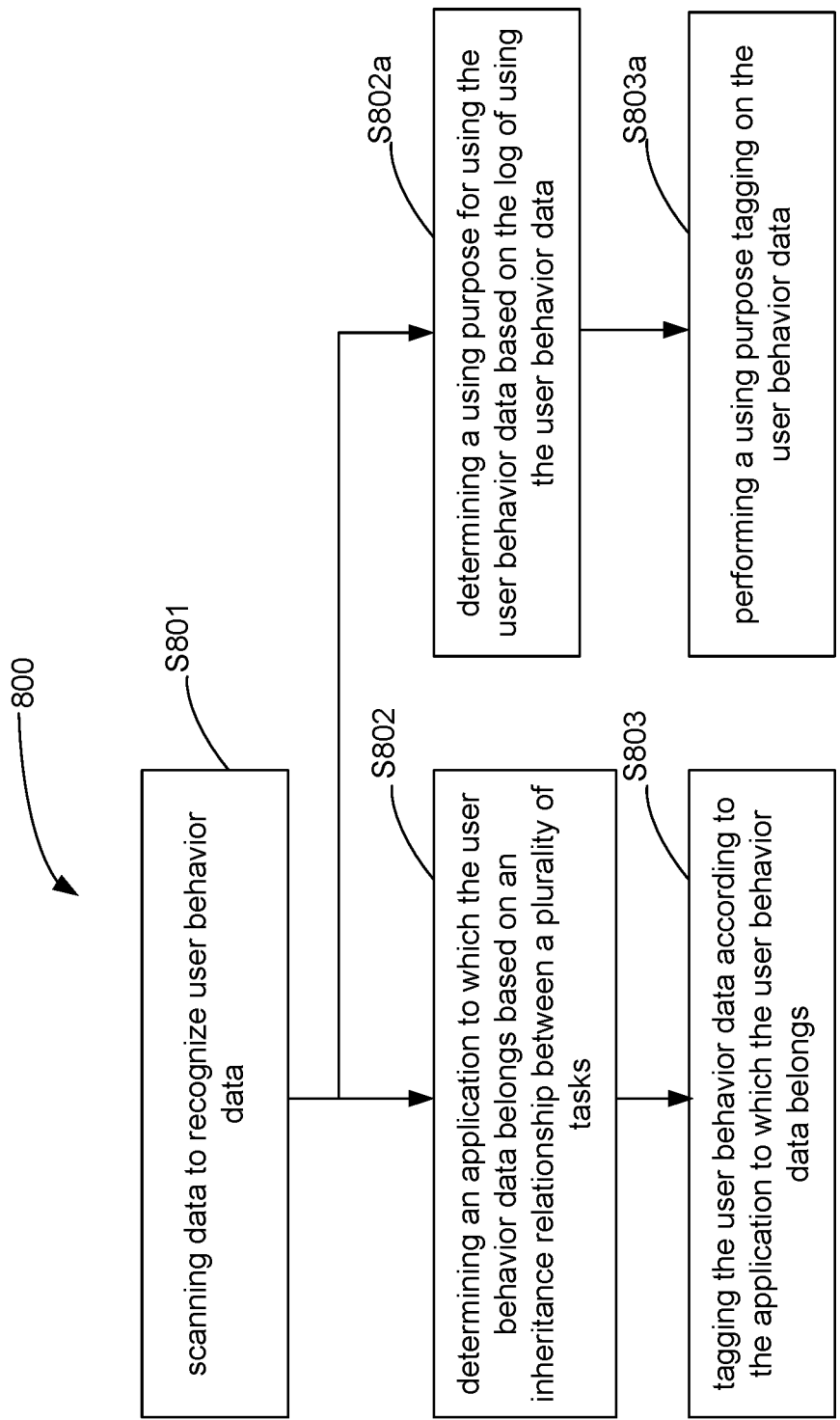
FIG. 8 is another schematic flowchart showing a processing method for user behavior data according to an embodiment of the invention.

The processing on the user behavior data performed by the user behavior data processing device 701 shown in the FIG. 7 may be, e.g., as shown in FIG. 8, which is another schematic flowchart 800 showing a processing method for user behavior data according to an embodiment of the invention. The processing method may include the following steps.

S801: scanning data to recognize user behavior data. The processing in the step may be performed by the data scanning module 106. After the step S801 is performed, step S802 and S802a may be performed.

S802: determining an application to which the user behavior data belongs based on an inheritance relationship between a plurality of tasks associated with the user behavior data. The processing in the step may be performed by the data analyzing module 707.

S802a: acquiring a log of using the user behavior data, and determining a using purpose for using the user behavior data based on the log of using the user behavior data. The processing in the step may be performed by the data analyzing module 707. More particularly, the operation of determining a using purpose for using the user behavior data based on the log of using the user behavior data may include:

determining the using purpose as a using purpose affecting users' using, if the number of times and/or frequency of using the user behavior data is larger than a preset first threshold and/or the using on the user behavior data affects subsequent users' using behaviors; or determining the using purpose as a using purpose unassociated with users' using, if the user behavior data are unassociated with subsequent users' using behaviors.

The step S802 and the step S802a may be performed simultaneously, may be performed separately, or may be performed in any sequence.

S803: tagging the user behavior data according to the application to which the user behavior data belongs. The processing in the step may be performed by the tagging module 708.

S803a: performing a using purpose tagging on the user behavior data. The processing in the step may be performed by the tagging module 708.

The step S803 and the step S803a may be performed simultaneously, may be performed separately, or may be performed in any sequence. Furthermore, there is no specific precedence relationship between step S802a and step S803, and between step S802 and step S803a.

The specific processing in the steps has been described in detail above, and repeated description would be omitted herein to avoid redundancy.

Figure 9:
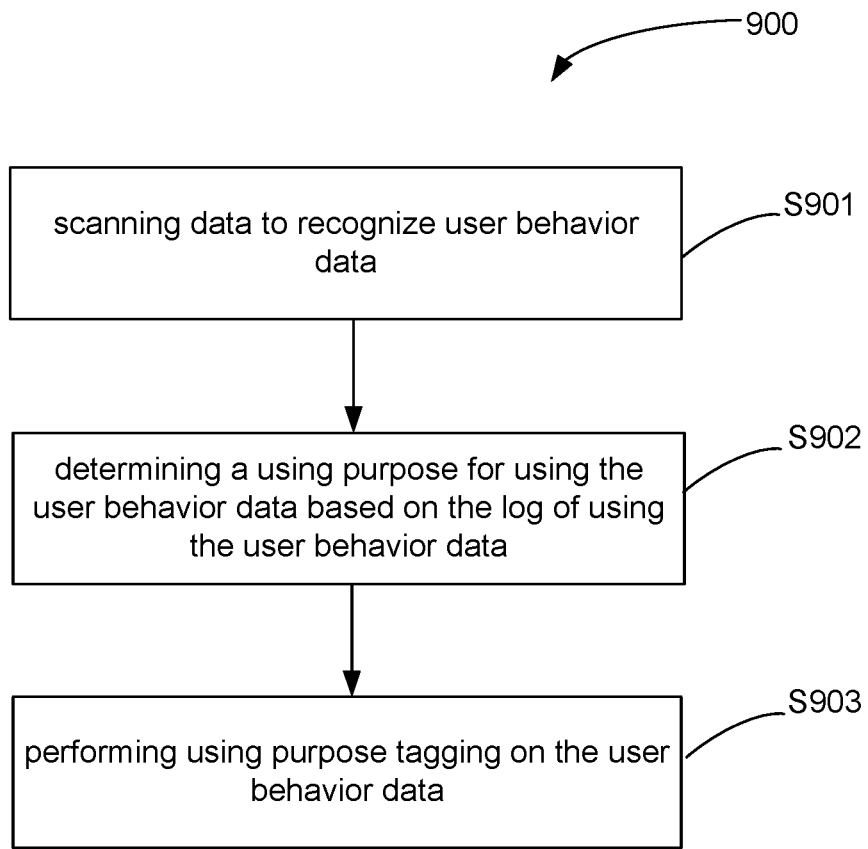
FIG. 9 is another schematic flowchart showing a processing method for user behavior data according to an embodiment of the invention.

Furthermore, the processing on the user behavior data performed by the user behavior data processing device 701 in the FIG. 7 may also be, e.g., as shown in FIG. 9, which is another schematic flowchart 900 showing a processing method for user behavior data according to an embodiment of the invention. In this flowchart, the operation of tagging the user behavior data based on different using purposes for using the user behavior data may be independent of the processing of tagging the user behavior data based on the application to which the user behavior data belongs described above.

The processing method may include the following steps.

S901: scanning data to recognize user behavior data. The processing in the step may be performed by the data scanning module 106.

S902: acquiring a log of using the user behavior data, and determining a using purpose for using the user behavior data based on the log of using the user behavior data. The processing in the step may be performed by the data analyzing module 707.

S903: performing using purpose tagging on the user behavior data. The processing in the step may be performed by the tagging module 708.

The specific processing in the steps has been illustrated in detail hereinbefore, and repeated description would be omitted herein to avoid redundancy.

Figure 10:
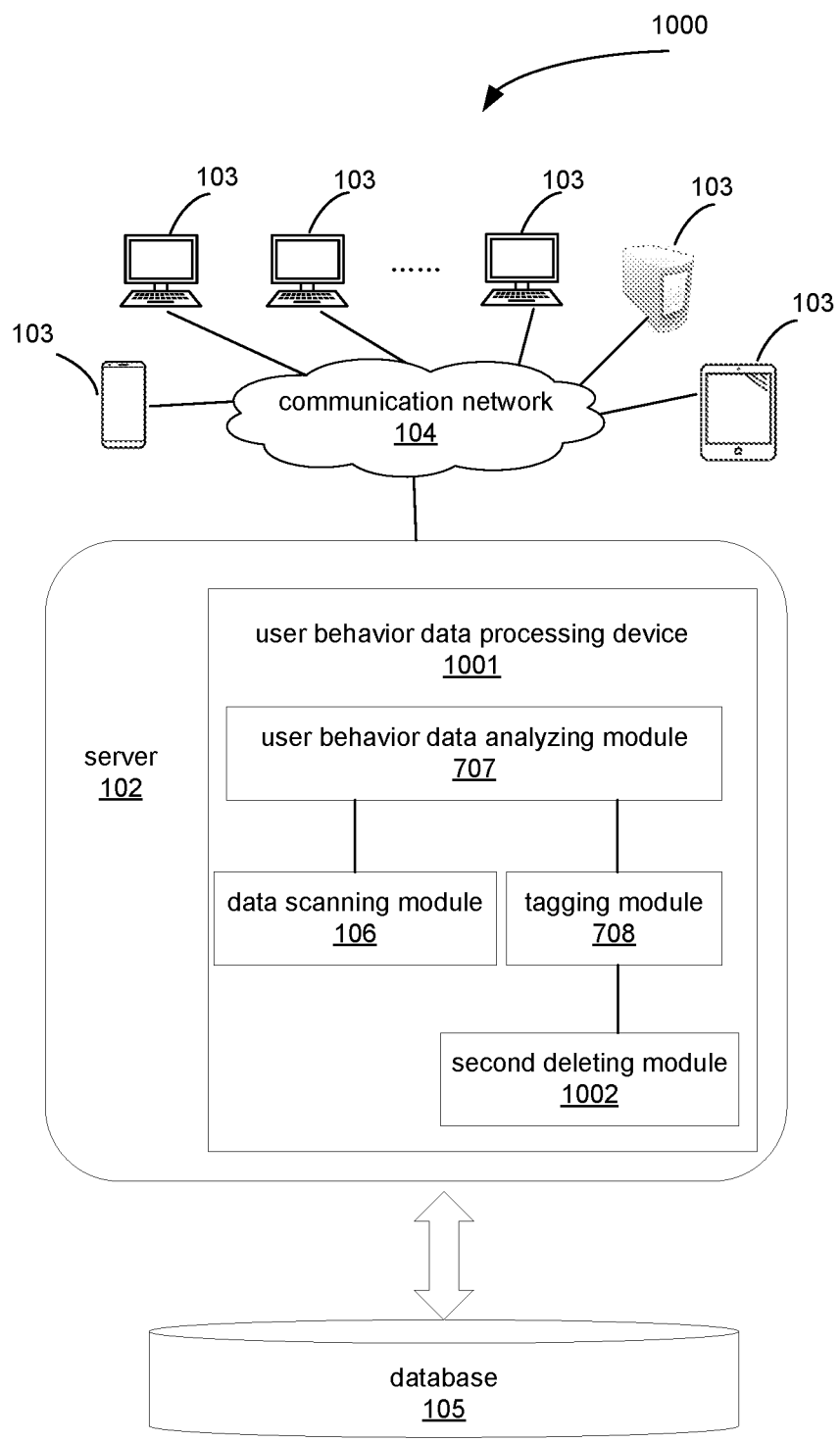
FIG. 10 is another exemplary block diagram showing a processing device for the user behavior data according to an embodiment of the present disclosure.

FIG. 10 is another exemplary block diagram 1000 showing a processing device for the user behavior data according to an embodiment of the present disclosure. The user behavior data processing device 1001 as shown in FIG. 10 may be same as the user behavior data processing device 701 as shown in FIG. 7, except that the user behavior data processing device 1001 in FIG. 10 further includes a second deleting module 1002.

The second deleting module 1002 may be configured to delete user's using behavior data of a specified application, in response to an instruction for deleting the user's using behavior data of the specified application.

The exemplary process may be include: acquiring user's using behavior data of an application tagged as the specified application; deleting user's using behavior data immediately, if the using purpose for using the user using behavior data is a using purpose affecting users' using; or deleting user's using behavior data after a preset allowable time period, if the using purpose of the user using behavior data is a using purpose unassociated with users' using. The allowable time as cited above may be determined as needs. For example, user behavior data used by an engineer for debugging an application or a service or an operating system may be retained for a relatively long time period, which may be set as, e.g., 180 days, to ensure smooth completion of the processing of debugging. The user behavior data for such using purpose generally may be automatically deleted as the debugging process is completed. The allowable time period set for the using on user behavior data by an operating system or some applications or services for data statistics may be less than the allowable time period set for the using on user behavior data for the debugging purpose, and may be set as, e.g., 30 days, so as to reduce the risks of revealing user's privacy.

Figure 11:
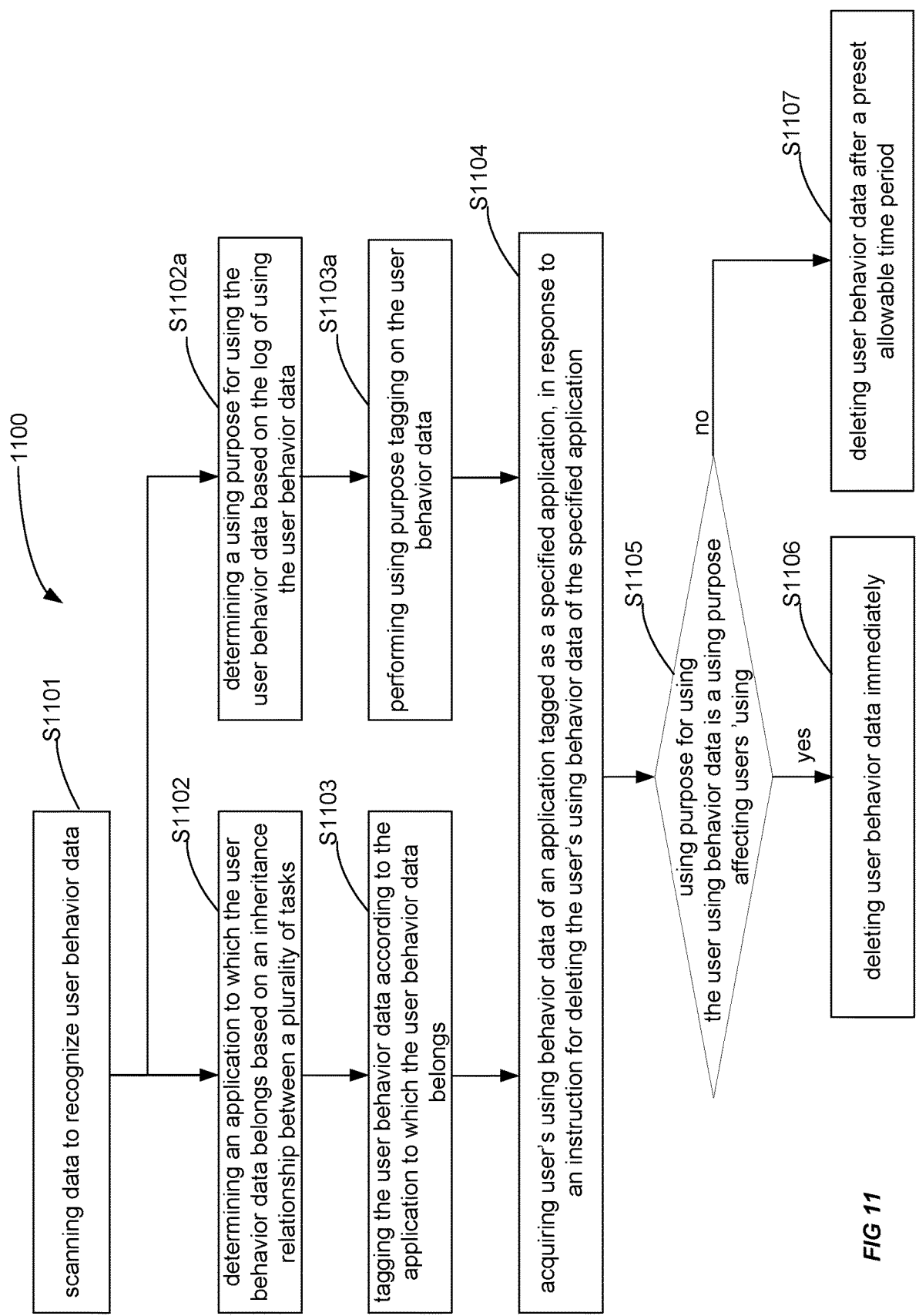
FIG. 11 is another schematic flowchart showing a processing method for user behavior data according to an embodiment of the invention.

The processing on the user behavior data performed by the user behavior data processing device 1001 shown in the FIG. 10 may be, e.g., as shown in FIG. 11, which is another schematic flowchart 1100 showing a processing method for user behavior data according to an embodiment of the invention. The processing method may include the following steps.

S1101: scanning data to recognize user behavior data. The processing in the step may be performed by the data scanning module 106. After the step S1101 is performed, step S1102 and S1102a may be performed.

S1102: determining an application to which the user behavior data belongs based on an inheritance relationship between a plurality of tasks associated with the user behavior data. The processing in the step may be performed by the data analyzing module 707.

S1102a: acquiring a log of using the user behavior data, and determining a using purpose for using the user behavior data based on the log of using the user behavior data. The processing in the step may be performed by the data analyzing module 707. The processing of determining a using purpose for using the user behavior data based on the log of using the user behavior data may include:

determining the using purpose as a using purpose affecting users' using, if the number of times and/or frequency of using the user behavior data is larger than a preset first threshold and/or the using on the user behavior data affects subsequent users' using behaviors; or determining the using purpose as a using purpose unassociated with users' using, if the user behavior data are unassociated with subsequent users' using behaviors.

The above step S1102 and the step S1102a may be performed simultaneously, may be performed separately, and may be performed in any sequence.

S1103: tagging the user behavior data according to the application to which the user behavior data belongs. The processing in the step may be performed by the tagging module 708.

S1103a: performing using purpose tagging on the user behavior data. The processing in the step may be performed by the tagging module 708.

The step S1103 and the step S1103a may be performed simultaneously, may be performed separately, and may be performed in any sequence. Furthermore, there is no limitation on the precedence relationship between step S1102a and step S1103, and between step S1102 and step S1103a.

S1104: acquiring user's using behavior data of an application tagged as a specified application, in response to an instruction for deleting the user's using behavior data of the specified application.

S1105: determining whether or not the using purpose for using the user using behavior data is a using purpose affecting users' using, and going to the step S1106, if the using purpose for using the user using behavior data is determined as a using purpose affecting users' using, and going to step S1107, if the using purpose for using the user using behavior data is determined as a using purpose unassociated with users' using.

S1106: deleting user behavior data immediately.

S1107: deleting user behavior data after a preset allowable time period.

The processing in the steps S1104 to S1107 may be performed by the second deleting module 1002.

The specific processing in the steps has been described in detail above, and repeated description would be omitted herein to avoid redundancy

SPECIFIC EMBODIMENTS

In some examples, one or more components or modules and one or more steps as shown in FIG. 1 to FIG. 11 may be implemented by software, hardware, or in combination of software and hardware. For example, the above component or module and one or more steps may be implemented in system on chip (SoC). Soc may include: integrated circuit chip, including one or more of processing unit (such as center processing unit (CPU), micro controller, micro processing unit, digital signal processing unit (DSP) or the like), memory, one or more communication interface, and/or other circuit for performing its function and alternative embedded firmware.

Figure 12:
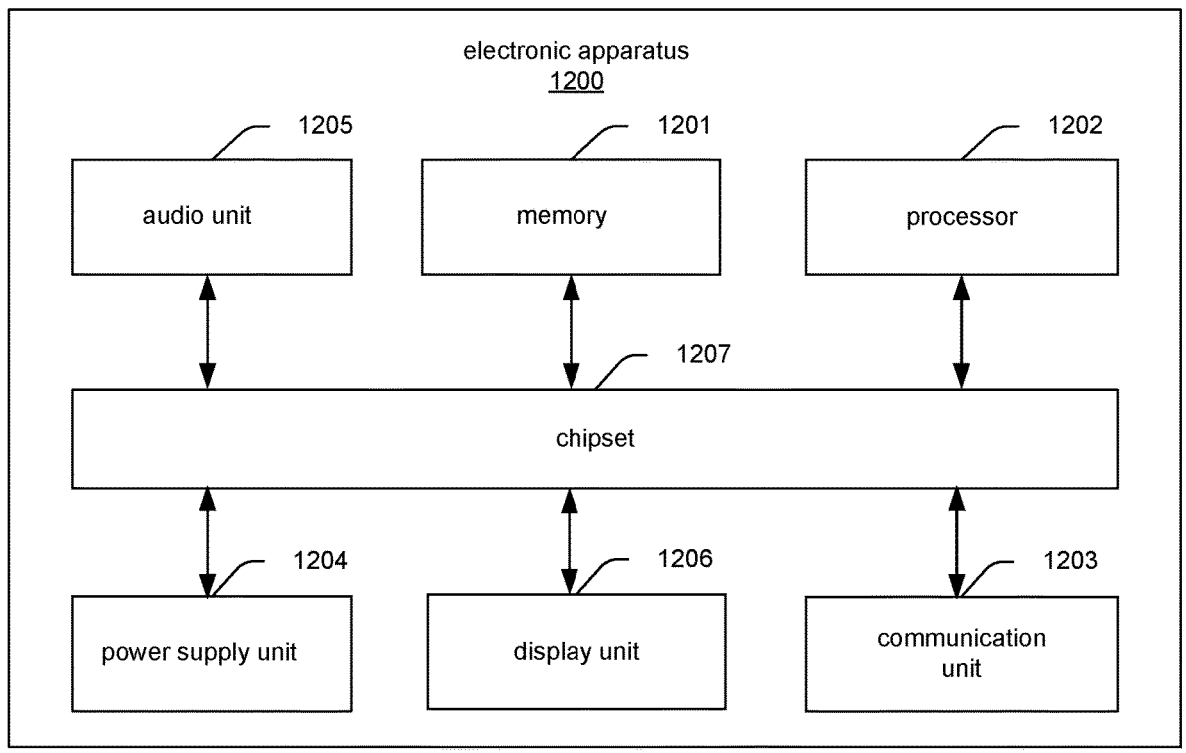
FIG. 12 is a block diagram of an electronic apparatus according to an embodiment of the invention.

FIG. 12 is a block diagram of an electronic apparatus 1200 according to an embodiment of the invention. The electronic apparatus 1200 includes a memory 1201 and a processor 1202.

The memory 1201 may be configured to store programs. In addition to the above programs, the memory 1201 may be configured to store other data to support operations on the electronic apparatus 1200. The examples of these data may include instructions of any applications or methods operated on the electronic apparatus 1200, contact data, phone book data, messages, pictures, videos, and the like.

The memory 1201 may be implemented by any kind of volatile or nonvolatile storage device or their combinations, such as static random access memory (SRAM), electronically erasable programmable read-only memory (EEPROM), erasable programmable read-only memory (EPROM), programmable read-only memory (PROM), read-only memory (ROM), magnetic memory, flash memory, disk memory, or optical disk.

The memory 1201 may be coupled to the processor 1202 and contain instructions stored thereon. The instructions may cause the electronic apparatus 1200 to perform operations upon being executed by the processor 1202, the operations may include:

scanning data to recognize user behavior data;

determining an application to which the user behavior data belongs based on an inheritance relationship between a plurality of tasks associated with the user behavior data; and tagging the user behavior data according to the application to which the user behavior data belongs.

More particularly, the operations may further include:

determining the inheritance relationship between the plurality of tasks based on a using record of using the user behavior data by the tasks and/or a generating record of generating the user behavior data by the tasks recorded in a system log.

More particularly, the determining an application to which the user behavior data belongs based on an inheritance relationship between a plurality of tasks associated with the user behavior data may include:

performing recognizing on applications to which the plurality of tasks with the inheritance relationship belong, and determining an application having a function of recording user behavior data as the application to which the user behavior data belongs, if the application having a function of recording user behavior data is recognized.

More particularly, the determining an application to which the user behavior data belongs based on an inheritance relationship between a plurality of tasks associated with the user behavior data may include:

determining an application to which a task being a source in the inheritance relationship belongs as the application to which the user behavior data belongs.

More particularly, the operations may further include:

acquiring a log of using the user behavior data;

determining a using purpose for using the user behavior data based on the log of using the user behavior data; and performing using purpose tagging on the user behavior data based on the using purpose.

More particularly, the determining a using purpose for using the user behavior data based on the log of using the user behavior data may include:

tagging the user behavior data as user behavior data affecting users' using, if the number of times and/or frequency of using the user behavior data is larger than a preset first threshold and/or the using on the user behavior data affects subsequent users' using behaviors; or tagging the user behavior data as user behavior data unassociated with users' using, if the user behavior data is unassociated with subsequent users' using behaviors.

More particularly, the operations may further include:

acquiring user's using behavior data of an application tagged as a specified application, and deleting user's using behavior data of the specified application, in response to an instruction for deleting user using behavior data of the specified application.

More particularly, the operations may further include:

acquiring user's using behavior data of an application tagged as a specified application, in response to an instruction for deleting user's using behavior data of the specified application; and deleting the user's using behavior data immediately, if the user's using behavior data is user behavior data affecting users' using; or deleting the user's using behavior data after a preset allowable time period, if the user's using behavior data is user behavior data unassociated with users' using.

As another example of the electronic apparatus, the operations may include:

scanning data to recognize user behavior data;

acquiring a log of using the user behavior data, and determining a using purpose for using the user behavior data based on the log of using the user behavior data; and performing using purpose tagging on the user behavior data based on the using purpose.

More particularly, the determining a using purpose for using the user behavior data based on the log of using the user behavior data includes:

tagging the user behavior data as user behavior data affecting users' using, if the number of times and/or frequency of using the user behavior data is larger than a preset first threshold and/or the using on the user behavior data affects subsequent users' using behaviors; or tagging the user behavior data as user behavior data unassociated with users' using, if the user behavior data is unassociated with subsequent users' using behaviors.

Detailed description has been made on the above operations in the above embodiments of method and device. The description on the above operations may be applied to electronic apparatus 1200. That is to say, the specific operations mentioned in the above embodiments may be recorded in memory 1201 in program and be performed by processor 1202.

Furthermore, as shown in FIG. 12, the electronic apparatus 1200 may further include: a communication unit 1203, a power supply unit 1204, an audio unit 1205, a display unit 1206, chipset 1207, and other units. Only part of units are exemplarily shown in FIG. 12 and it is obvious to one skilled in the art that the electronic apparatus 1200 only includes the units shown in FIG. 12.

The communication unit 1203 may be configured to facilitate wireless or wired communication between the electronic apparatus 1200 and other apparatuses. The electronic apparatus may be connected to wireless network based on communication standard, such as WiFi, 2G, 3G, or their combination. In an exemplary example, the communication unit 1203 may receive radio signal or radio related information from external radio management system via radio channel. In an exemplary example, the communication unit 1203 may further include near field communication (NFC) module for facilitating short-range communication. For example, the NFC module may be implemented with radio frequency identification (RFID) technology, Infrared data association (IrDA) technology, ultra wideband (UWB) technology, Bluetooth (BT) technology and other technologies.

The power supply unit 1204 may be configured to supply power to various units of the electronic device. The power supply unit 1204 may include a power supply management system, one or more power supplies, and other units related to power generation, management, and allocation.

The audio unit 1205 may be configured to output and/or input audio signals. For example, the audio unit 1205 may include a microphone (MIC). When the electronic apparatus in an operation mode, such as calling mode, recording mode, and voice recognition mode, the MIC may be configured to receive external audio signals. The received audio signals may be further stored in the memory 1201 or sent via the communication unit 1203. In some examples, the audio unit 1205 may further include a speaker configured to output audio signals.

The display unit 1206 may include a screen, which may include liquid crystal display (LCD) and touch panel (TP). If the screen includes a touch panel, the screen may be implemented as touch screen so as to receive input signal from users. The touch panel may include a plurality of touch sensors to sense touching, sliding, and gestures on the touch panel. The touch sensor may not only sense edges of touching or sliding actions, but also sense period and pressure related to the touching or sliding operations.

The above memory 1201, processor 1202, communication unit 1203, power supply unit 1204, audio unit 1205 and display unit 1206 may be connected with the chipset 1207. The chipset 1207 may provide interface between the processor 1202 and other units of the electronic apparatus 1200. Furthermore, the chipset 1207 may provide interface for each unit of the electronic apparatus 1200 to access the memory 1201 and communication interface for accessing among units.

EXAMPLE CLAUSES

A. A method, including:
scanning data to recognize user behavior data;
determining an application to which the user behavior data belongs based on an inheritance relationship between a plurality of tasks associated with the user behavior data; and
tagging the user behavior data according to the application to which the user behavior data belongs.

B. The method according to paragraph A, further including:
determining the inheritance relationship between the plurality of tasks based on a using record of using the user behavior data by the tasks and/or a generating record of generating the user behavior data by the tasks recorded in a system log.

C. The method according to paragraph A, wherein
the determining an application to which the user behavior data belongs based on an inheritance relationship between a plurality of tasks associated with the user behavior data includes:
performing recognizing on applications to which the plurality of tasks with the inheritance relationship belong, and determining an application having a function of recording user behavior data as the application to which the user behavior data belongs, if the application having a function of recording user behavior data is recognized.

D. The method according to paragraph A, wherein
the determining an application to which the user behavior data belongs based on an inheritance relationship between a plurality of tasks associated with the user behavior data includes:
determining an application to which a task being a source in the inheritance relationship belongs as the application to which the user behavior data belongs.

E. The method according to paragraph A, further including:
acquiring a log of using the user behavior data;
determining a using purpose for using the user behavior data based on the log of using the user behavior data; and
tagging the user behavior data based on the using purpose.

F. The method according to paragraph E, wherein the determining a using purpose for using the user behavior data based on the log of using the user behavior data includes:
determining the using purpose for using the user behavior data as a using purpose affecting users' using, if the number of times and/or frequency of using the user behavior data is larger than a preset first threshold and/or the using on the user behavior data affects subsequent users' using behaviors; and
determining the using purpose for using the user behavior data as a using purpose unassociated with users' using, if the user behavior data is unassociated with subsequent users' using behaviors.

G. The method according to paragraph A, further including:
acquiring user's using behavior data of an application tagged as a specified application, and deleting user's using behavior data of the specified application, in response to an instruction for deleting user using behavior data of the specified application.

H. The method according to paragraph F, further including:

acquiring user's using behavior data of an application tagged as a specified application, in response to an instruction for deleting user's using behavior data of the specified application;

deleting user's using behavior data immediately, if the using purpose for using the user using behavior data is a using purpose affecting users' using; and deleting user's using behavior data after a preset allowable time period, if the using purpose of the user's using behavior data is a using purpose unassociated with users' using.

I. A device, including:

a data scanning module configured to scan data to recognize user behavior data;

a user behavior data analyzing module configured to determine an application to which the user behavior data belongs based on an inheritance relationship between a plurality of tasks associated with the user behavior data; and a tagging module configured to tag the user behavior data with the application to which the user behavior data belongs.

J. The device according to paragraph I, wherein the user behavior data analyzing module is further configured to determine the inheritance relationship between the plurality of tasks based on a using record of using the user behavior data by the tasks and/or a generating record of generating the user behavior data by the tasks recorded in a system log.

K. The device according to paragraph I, wherein the determining an application to which the user behavior data belongs based on an inheritance relationship between a plurality of tasks associated with the user behavior data includes:

recognizing an application to which the plurality of tasks with the inheritance relationship belong, and determining an application having a function of recording user behavior data as the application to which the user behavior data belongs, if the application having a function of recording user behavior data is recognized.

L. The device according to paragraph I, wherein the determining an application to which the user behavior data belongs based on an inheritance relationship between a plurality of tasks associated with the user behavior data includes:

determining an application to which a task being a source in the inheritance relationship belongs as the application to which the user behavior data belongs.

M. The device according to paragraph I, wherein the user behavior data analyzing module is further configured to acquire a log of using the user behavior data; and determine a using purpose for using the user behavior data based on the log of using the user behavior data; and the tagging module is further configured to tag the user behavior data based on the using purpose.

N. The device according to paragraph M, wherein the determining a using purpose for using the user behavior data based on the log of using the user behavior data includes:

determining the using purpose for using the user behavior data as a using purpose affecting users' using, if the number of times and/or frequency of using the user behavior data is more than a preset first threshold and/or the using on the user behavior data affects subsequent users' using behaviors; or determining the using purpose for using the user behavior data as a using purpose unassociated with users' using, if the user behavior data is unassociated with subsequent users' using behaviors.

O. The device according to paragraph I, further including:

a first deleting module configured to acquire user's using behavior data of an application tagged as a specified application, and deleting user's using behavior data of the specified application, in response to an instruction for deleting user using behavior data of the specified application.

P. The device according to paragraph N, further including:

a second deleting module configured to acquire user's using behavior data of an application tagged as the specified application, in response to an instruction for deleting user's using behavior data of the specified application;

deleting user's using behavior data immediately, if the using purpose for using the user using behavior data is a using purpose affecting users' using; and deleting user's using behavior data after a preset allowable time period, if the using purpose of the user's using behavior data is a using purpose unassociated with users' using.

Q. An electronic apparatus, including:

a processing unit; and a memory, coupled to the processing unit and containing instructions stored thereon, the instructions cause the electronic apparatus to perform operations upon being executed by the processing unit, the operations include:

scanning data to recognize user behavior data;

determining an application to which the user behavior data belongs based on an inheritance relationship between a plurality of tasks associated with the user behavior data; and tagging the user behavior data according to the application to which the user behavior data belongs.

R. The electronic apparatus according to paragraph Q, wherein the operations further include:

determining the inheritance relationship between the plurality of tasks based on a using record of using the user behavior data by the tasks and/or a generating record of generating the user behavior data by the tasks recorded in a system log.

S. The electronic apparatus according to paragraph Q, wherein the operations further include:

acquiring a log of using the user behavior data;

determining a using purpose for using the user behavior data based on the log of using the user behavior data; and tagging the user behavior data based on the using purpose.

T. The electronic apparatus according to paragraph S, wherein the determining a using purpose for using the user behavior data based on the log of using the user behavior data includes:

determining the using purpose for using the user behavior data as a using purpose affecting users' using, if the number of times and/or frequency of using the user behavior data is larger than a preset first threshold and/or the using on the user behavior data affects subsequent users' using behaviors; and determining the using purpose for using the user behavior data as a using purpose unassociated with users' using, if the user behavior data is unassociated with subsequent users' using behaviors.

U. The electronic apparatus according to paragraph T, the operations further include:

acquiring user's using behavior data of an application tagged as a specified application, in response to an instruction for deleting user's using behavior data of the specified application;

deleting user's using behavior data immediately, if the using purpose for using the user using behavior data is a using purpose affecting users' using; and deleting user's using behavior data after a preset allowable time period, if the using purpose of the user's using behavior data is a using purpose unassociated with users' using.

V. The electronic apparatus according to paragraph Q, wherein the determining an application to which the user behavior data belongs based on an inheritance relationship between a plurality of tasks associated with the user behavior data includes:

performing recognizing on applications to which the plurality of tasks with the inheritance relationship belong, and determining an application having a function of recording user behavior data as the application to which the user behavior data belongs, if the application having a function of recording user behavior data is recognized.

W. The electronic apparatus according to paragraph Q, wherein the determining an application to which the user behavior data belongs based on an inheritance relationship between a plurality of tasks associated with the user behavior data includes:

determining an application to which a task being a source in the inheritance relationship belongs as the application to which the user behavior data belongs.

X. The electronic apparatus according to paragraph Q, wherein the operations further include:

acquiring user's using behavior data of an application tagged as a specified application, and deleting user's using behavior data of the specified application, in response to an instruction for deleting user using behavior data of the specified application.

CONCLUSION

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation", "one implementation", "some implementations", or "other implementations" may mean that a particular feature, structure, or characteristic described in connection with one or more implementations may be included in at least some implementations, but not necessarily in all implementations. The various appearances of "an implementation", "one implementation", or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims It would be obvious to one skilled in the art that, all or part of steps for implementing the above embodiments may be accomplished by hardware related to programs or instructions. The above program may be stored in a computer readable storing medium. Such program may perform the steps of the above embodiments upon being executed. The above storing medium may include: ROM, RAM, magnetic disk, or optic disk or other medium capable of storing program codes.

It should be noted that the foregoing embodiments are merely used to illustrate the technical solution of the present disclosure, and not to limit the present disclosure. Although the present disclosure has been described in detail with reference to the foregoing embodiments, one skilled in the art would understand that the technical solutions recited in the foregoing embodiments may be modified or all or a part of the technical features may be replaced equally. These modifications and replacements are not intended to make corresponding technical solution depart from the scope of the technical solution of embodiments of the present disclosure.

The invention claimed is:

1. A device, comprising:
    at least one processor; and
    memory comprising instructions that, when executed by the at least one processor, cause the at least one processor to perform operations to:
        scan data to recognize user behavior data;
        acquire a log of using the user behavior data;
        determine a using purpose for using the user behavior data based on the log of using the user behavior data;
        determine an application to which the user behavior data belongs based on an inheritance relationship between a plurality of tasks associated with the user behavior data; and
        tag the application to which the user behavior data belongs and based on the using purpose.

2. The device according to claim 1, the memory further comprising instructions that, when executed by the at least one processor, cause the at least one processor to perform operations to:
    determine the inheritance relationship between the plurality of tasks based on a using record of using the user behavior data by the tasks and/or a generating record of generating the user behavior data by the tasks recorded in a system log.

3. The device according to claim 1, wherein the instructions to determine an application to which the user behavior data belongs based on an inheritance relationship between a plurality of tasks associated with the user behavior data comprises instructions to:
    perform recognition on applications to which the plurality of tasks with the inheritance relationship belong, and determine an application having a function of recording user behavior data as the application to which the user behavior data belongs, if the application having a function of recording user behavior data is recognized.

4. The device according to claim 1, wherein the instructions to determine an application to which the user behavior data belongs based on an inheritance relationship between a plurality of tasks associated with the user behavior data comprises instructions to:
    determine an application to which a task being a source in the inheritance relationship belongs as the application to which the user behavior data belongs.

5. The device according to claim 1, the memory further comprising instructions that, when executed by the at least one processor, cause the at least one processor to perform operations to:
    acquire a log of using the user behavior data; and determine a using purpose for using the user behavior data based on the log of using the user behavior data; and
    tag the user behavior data based on the using purpose.

6. The device according to claim 5, wherein the instructions to determine a using purpose for using the user behavior data based on the log of using the user behavior data comprises instructions to:
    determine the using purpose for using the user behavior data as a using purpose affecting users' using, if the number of times and/or frequency of using the user behavior data is larger than a preset first threshold and/or the using on the user behavior data affects subsequent users' using behaviors; or
    determine the using purpose for using the user behavior data as a using purpose unassociated with users' using, if the user behavior data is unassociated with subsequent users' using behaviors.

7. The device according to claim 1, the memory further comprising instructions that, when executed by the at least one processor, cause the at least one processor to perform operations to:
    acquire user's using behavior data of an application tagged as a specified application, and delete user's using behavior data of the specified application, in response to an instruction for deletion of a user using behavior data of the specified application.

8. The device according to claim 6, the memory further comprising instructions that, when executed by the at least one processor, cause the at least one processor to perform operations to:
    acquire user's using behavior data of an application tagged as a specified application, in response to an instruction for deleting user's using behavior data of the specified application;
    delete user's using behavior data immediately, if the using purpose for using the user using behavior data is a using purpose affecting users' using; and
    delete user's using behavior data after a preset allowable time period, if the using purpose of the user's using behavior data is a using purpose unassociated with users' using.

9. A method, comprising:
    scanning data to recognize user behavior data;
    acquiring a log of using the user behavior data;
    determining a using purpose for using the user behavior data based on the log of using the user behavior data;
    determining an application to which the user behavior data belongs based on an inheritance relationship between a plurality of tasks associated with the user behavior data; and
    tagging the user behavior data according to the application to which the user behavior data belongs and based on the using purpose.

10. The method according to claim 9, wherein the determining an application to which the user behavior data belongs based on an inheritance relationship between a plurality of tasks associated with the user behavior data. comprises:
    performing recognizing on applications to which the plurality of tasks with the inheritance relationship belong, and determining an application having a function of recording user behavior data as the application to which the user behavior data belongs, if the application having a function of recording user behavior data is recognized.

11. The method according to claim 9, wherein
    the determining an application to which the user behavior data belongs based on an inheritance relationship between a plurality of tasks associated with the user behavior data comprises:

determining an application to which a task being a source in the inheritance relationship belongs as the application to which the user behavior data belongs.

12. The method according to claim 9, wherein the determining a using purpose for using the user behavior data based on the log of using the user behavior data comprises:

determining the using purpose for using the user behavior data as a using purpose affecting users' using, if the number of times and/or frequency of using the user behavior data is larger than a preset first threshold and/or the using on the user behavior data affects subsequent users' using behaviors; and determining the using purpose for using the user behavior data as a using purpose unassociated with users' using, if the user behavior data is unassociated with subsequent users' using behaviors.

13. The method according to claim 12, further comprising:

acquiring user's using behavior data of an application tagged as a specified application, in response to an instruction for deleting user's using behavior data of the specified application;

deleting user's using behavior data immediately, if the using purpose for using the user using behavior data is a using purpose affecting users' using; and deleting user's using behavior data after a preset allowable time period, if the using purpose of the user's using behavior data is a using purpose unassociated with users' using.

14. An electronic apparatus, comprising:

a processing unit; and a memory, coupled to the processing unit and containing instructions stored thereon, the instructions cause the electronic apparatus to perform operations upon being executed by the processing unit, the operations comprise:

scanning data to recognize user behavior data;

acquiring a log of using the user behavior data;

determining a using purpose for using the user behavior data based on the log of using the user behavior data;

determining an application to which the user behavior data belongs based on an inheritance relationship between a plurality of tasks associated with the user behavior data; and tagging the user behavior data according to the application to which the user behavior data belongs and based on the using purpose.

15. The electronic apparatus according to claim 14, wherein the determining an application to which the user behavior data belongs based on an inheritance relationship between a plurality of tasks associated with the user behavior data comprises:

performing recognizing on applications to which the plurality of tasks with the inheritance relationship belong, and determining an application having a function of recording user behavior data as the application to which the user behavior data belongs, if the application having a function of recording user behavior data is recognized.

16. The electronic apparatus according to claim 14, wherein the determining an application to which the user behavior data belongs based on an inheritance relationship between a plurality of tasks associated with the user behavior data comprises:

determining an application to which a task being a source in the inheritance relationship belongs as the application to which the user behavior data belongs.

17. The electronic apparatus according to claim 14, the memory further comprising instructions that cause the electronic apparatus to perform operations comprising:

acquiring user's using behavior data of an application tagged as a specified application, and deleting user's using behavior data of the specified application, in response to an instruction for deleting user using behavior data of the specified application.

18. The electronic apparatus according to claim 17, wherein the determining a using purpose for using the user behavior data based on the log of using the user behavior data comprises:

determining the using purpose for using the user behavior data as a using purpose affecting users' using, if the number of times and/or frequency of using the user behavior data is larger than a preset first threshold and/or the using on the user behavior data affects subsequent users' using behaviors; and determining the using purpose for using the user behavior data as a using purpose unassociated with users' using, if the user behavior data is unassociated with subsequent users' using behaviors.

19. The electronic apparatus according to claim 18, the memory further comprising instructions that cause the electronic apparatus to perform operations comprising:

acquiring user's using behavior data of an application tagged as a specified application, in response to an instruction for deleting user's using behavior data of the specified application;

deleting user's using behavior data immediately, if the using purpose for using the user using behavior data is a using purpose affecting users' using; and deleting user's using behavior data after a preset allowable time period, if the using purpose of the user's using behavior data is a using purpose unassociated with users' using.

* * * * *